United States Patent
Aust et al.

(10) Patent No.: US 11,805,099 B2
(45) Date of Patent: Oct. 31, 2023

(54) COMPUTING SYSTEM AND METHOD FOR OPERATING A COMPUTING SYSTEM

(71) Applicant: Siemens Mobility GmbH, Munich (DE)

(72) Inventors: Frank Aust, Salzgitter (DE); Matthias Seifert, Buchholz (DE); Martin Wimmer, Neubiberg (DE)

(73) Assignee: Siemens Mobility GmbH, Munich (DE)

( * ) Notice: Subject to any disclaimer, the term of this patent is extended or adjusted under 35 U.S.C. 154(b) by 132 days.

(21) Appl. No.: 17/619,007

(22) PCT Filed: Jun. 9, 2020

(86) PCT No.: PCT/EP2020/065906
§ 371 (c)(1),
(2) Date: Dec. 14, 2021

(87) PCT Pub. No.: WO2020/249536
PCT Pub. Date: Dec. 17, 2020

(65) Prior Publication Data
US 2022/0417214 A1   Dec. 29, 2022

(30) Foreign Application Priority Data
Jun. 14, 2019  (DE) .................. 10 2019 208 711.6

(51) Int. Cl.
*H04L 9/40* (2022.01)
(52) U.S. Cl.
CPC ...... *H04L 63/0209* (2013.01); *H04L 63/0428* (2013.01)
(58) Field of Classification Search
CPC .............. H04L 63/0209; H04L 63/0428
See application file for complete search history.

(56) References Cited

U.S. PATENT DOCUMENTS

| 8,161,529 B1 | 4/2012 | Bortz et al. |
| 8,397,286 B2 | 3/2013 | Declety et al. |

(Continued)

FOREIGN PATENT DOCUMENTS

| CN | 103930297 A | 7/2014 |
| CN | 107645310 A | 1/2018 |

(Continued)

OTHER PUBLICATIONS

Ricarda Weber et al: Überwachung sicherheitskritischer Bahnnetzwerke Gateways—Monitoring safety—critical railway networks using unidirectional ~ Signal und Draht: signalling & datacommunication, Bd. 110, Nr. 9, Sep. 7, 2018 (Sep. 7, 2018), Seiten 21-28, XP055509E DE ISSN: 0037-4997.

(Continued)

*Primary Examiner* — Chau Le
(74) *Attorney, Agent, or Firm* — Laurence A. Greenberg; Werner H. Stemer; Ralph E. Locher

(57) ABSTRACT

A computing system has a computing device. The computing system has an input data path, which unidirectionally connects an interface device to the computing device, and an output data diode, which unidirectionally connects the computing device to the interface device. The input data path has a data lock which is connected to the interface device by a first terminal and to the computing device by a second terminal. The data lock has a storage unit for storing data and is configured such that the storage unit can be selectively connected solely to the first or second terminal but not to both terminals simultaneously. The computing device accepts data from the interface device solely if the data is transmitted to the computing device from the interface device via the input data path within a transmission session initiated by the computing device using the output data diode.

14 Claims, 5 Drawing Sheets

(56) References Cited

U.S. PATENT DOCUMENTS

| | | | |
|---|---|---|---|
| 9,749,011 B2* | 8/2017 | Kim | H04B 3/50 |
| 10,833,965 B2* | 11/2020 | Blöcher | H04L 63/0227 |
| 11,368,437 B2* | 6/2022 | Wimmer | H04L 69/08 |
| 11,611,409 B2* | 3/2023 | Chan | H04L 1/0072 |
| 2004/0054792 A1 | 3/2004 | Pitsos | |
| 2005/0154823 A1 | 7/2005 | Bruner et al. | |
| 2010/0299742 A1 | 11/2010 | Declety et al. | |
| 2012/0260088 A1 | 10/2012 | Fries et al. | |
| 2012/0309455 A1 | 12/2012 | Klose et al. | |
| 2013/0114614 A1 | 5/2013 | Tran et al. | |
| 2014/0237372 A1* | 8/2014 | Mraz | H04L 67/125 |
| | | | 715/734 |
| 2014/0361608 A1 | 12/2014 | Wang | |
| 2017/0048259 A1 | 2/2017 | Dodge et al. | |
| 2018/0115528 A1* | 4/2018 | Rotvold | H04W 12/088 |
| 2018/0124121 A1* | 5/2018 | Blöcher | H04W 12/02 |
| 2019/0265667 A1 | 8/2019 | Yi et al. | |
| 2019/0303306 A1* | 10/2019 | Ren | G06F 13/102 |
| 2020/0120071 A1* | 4/2020 | Wimmer | H04L 69/165 |
| 2021/0286906 A1* | 9/2021 | Fries | G06F 21/79 |

FOREIGN PATENT DOCUMENTS

| | | |
|---|---|---|
| CN | 109565502 A | 4/2019 |
| DE | 102014226398 A1 | 6/2016 |
| DE | 102015205833 A1 | 10/2016 |
| DE | 102017104890 A1 | 9/2018 |
| EP | 2204034 A1 | 7/2010 |
| EP | 2035948 B1 | 4/2016 |
| EP | 3483769 A1 | 5/2019 |
| RU | 2289886 C2 | 12/2006 |
| RU | 2554532 C2 | 6/2015 |
| WO | WO 9946882 A2 | 9/1999 |
| WO | 2019007582 A1 | 1/2019 |

OTHER PUBLICATIONS

Suhas Rautmare: "SCADA System Security: Challenges and Recommendations", 2011 Annual IEEE India Conference, Jan. 26, 2012.

* cited by examiner

COMPUTING SYSTEM AND METHOD FOR OPERATING A COMPUTING SYSTEM

FIELD AND BACKGROUND OF THE INVENTION

The invention relates to computing systems and to methods for operating computing systems.

There is increasingly a need for remote maintenance ("remote access" in technical terminology) for security-critical computing systems. However, in particular applications, the system elements to be maintained are in a special security zone, to which no direct remote access is possible.

There is also an increasing need for the networking of security-relevant systems to conventional IT systems. In the case of such networking, it should be ensured that only permissible information elements are transmitted via the connection of these data networks. The data networks should be disconnected from one another for all other and therefore non-permissible information.

As is known, the data networks can be connected bidirectionally, for example using routers or gateways which have firewalls. However, critical networks with a very high need for protection are nowadays generally completely disconnected from other networks—such as the office network or the Internet.

In order to channel diagnostic data, for example, from a security-critical network in order for said data to be able to be analyzed by an expert at a remote location, data diodes which do not compromise the protection of the critical network are used nowadays.

A previously unsolved problem is now that of how data can also be transported in the other direction, that is to say from the non-secure network (for example open network) to the security-critical network (closed network), with a similarly high security requirement. These data are needed, for example, to change existing configurations or to install updates in the components present there.

SUMMARY OF THE INVENTION

The invention is based on the object of further developing computing systems and methods for remote monitoring with respect to secure reception of data from the outside.

This object is achieved, according to the invention, by means of a computing system having the features as claimed in the independent computing system patent claim. Advantageous configurations of the computing system according to the invention are specified in subclaims.

Accordingly, the invention provides for the computing system to have an input data path, which unidirectionally connects an interface device of the computing system to the computing device, and an output data diode, which unidirectionally connects the computing device to the interface device, for the input data path to have a data lock which is connected, by way of a first connection, to the interface device and, by way of a second connection, to the computing device, for the data lock to have a buffer for buffering data and to be configured such that the buffer can either be exclusively connected to the first or second connection, but not to both connections at the same time, and for the computing device to be configured in such a manner that it accepts data present in the interface device from the interface device only when said data are transmitted from the interface device to the computing device via the input data path within a transmission session initiated by the computing device itself with the inclusion of the output data diode.

An important advantage of the computing system according to the invention can be seen in the fact that, as a result of the combination according to the invention of the data lock and transmission sessions which are initiated by the computing device, both hardware separation between the computing device and external data transmitting devices is continuously ensured and—by virtue of the limitation to transmission sessions initiated by itself—content-related inclusion of the interface device and therefore software separation are always ensured, with the result that direct or immediate data access to the computing device from external data transmitting devices is made more difficult or is even made impossible in terms of hardware and software.

The transmission sessions are preferably encrypted.

The transmission sessions are preferably transmission sessions which include transmission of session context information, as also used, for example, on layer 5 of the OSI network model and protocol specifications such as ISO 8327/X.225, or are based on such context information. The transmission of the session context information is based here on two unidirectionally operated transmission branches, specifically one unidirectional path in the direction of the computing device via the input data path and another unidirectional path to the interface device via the output data diode.

In one advantageous embodiment variant, provision is made for the interface device to be suitable for receiving an external request message which comes from an external data transmitting device and indicates the desire of an external data transmitting device to transmit data to the computing device.

In the last-mentioned embodiment variant, it is advantageous if the interface device is configured in such a manner that, after receiving the external request message from an external data transmitting device, it creates a modified request message containing the request and forwards it to the data lock, wherein the modified request message contains identification data relating to the interface device.

It is particularly advantageous if the interface device is configured in such a manner that, after receiving the external request message, it carries out a check in order to determine whether the request message comes from an external data transmitting device which is authorized to transmit data, and, in the event of a request message from an authorized data transmitting device, it transmits the request message or the modified request message to the data lock and otherwise does not do so.

Alternatively or additionally, provision may be advantageously made for the interface device to be configured in such a manner that, after receiving the external request message, it carries out a check in order to determine whether the request message contains control commands or executable software modules, and, if this is the case, it does not forward the request message to the data lock.

It is also advantageous if the interface device buffers external data which have been transmitted by an external data transmitting device at the request of the computing device or without request, and the computing device is configured in such a manner that it accepts the data buffered in the interface device, in unprocessed form or in a form processed by the interface device, from the interface device only when said data are transmitted from the interface device to the computing device via the input data path within a transmission session which is initiated by the computing device itself with the inclusion of the output data diode and is preferably encrypted.

The input data path preferably has an input data diode which is arranged between the interface device and the data lock and allows data to be transmitted in the direction of the data lock arranged downstream and prevents this in the opposite direction.

The invention also relates to a railway system, in particular a signal tower or a rail vehicle. According to the invention, the railway system has a computing system as described above.

The invention also relates to a method for operating a computing system, in particular a computing system as described above. The invention provides for a computing device of the computing system to accept data from an external data transmitting device, which arrive via an interface device, only when said data are transmitted from the interface device via an input data path, which comprises a data lock arranged downstream of the interface device, within a transmission session which is initiated by the computing device itself with the inclusion of an output data diode and is preferably encrypted, wherein the data lock is either exclusively connected to the interface device or to the computing device in terms of the data stream, but is not connected to both at the same time.

With respect to the advantages of the method according to the invention and with respect to advantageous configurations of the method according to the invention, reference is made to the above statements in connection with the computing system according to the invention.

It is advantageous if, after receiving the data from the data transmitting device, the computing device creates a signature data record using the data and transmits it to the external data transmitting device via the output data diode, and the computing device only uses or considers the received data if the data transmitting device, after receiving the signature data record, reports back that the signature data record confirms correct data reception.

After receiving an external request message from an external data transmitting device, a modified request message containing the request is preferably created using the interface device and is forwarded to the data lock, wherein the modified request message contains identification data relating to the interface device.

Alternatively or additionally, it is advantageous if, after receiving an external request message, a check is carried out in order to determine whether the request message comes from an external data transmitting device which is authorized to transmit data, the request message or the modified request message is transmitted to the reception data diode in the event of a request message from an authorized data transmitting device and this is otherwise not carried out.

Alternatively or additionally, after receiving an external request message, provision may be advantageously made for a check to be carried out in order to determine whether the request message contains control commands or executable software modules, and, if this is the case, for the request message not to be forwarded to the reception data diode.

Alternatively or additionally, it is advantageous if, after receiving data from an external data transmitting device, the computing device creates a signature data record using said data and transmits the signature data record to the external data transmitting device via the output data diode.

Alternatively or additionally, provision may be advantageously made for the external or modified request message and/or the data from the external data transmitting device to be buffered in a buffer in the input data diode or using a buffer between the input data diode and the data lock and to only then be transmitted, in a manner divided into data packets, to the computing device data packet by data packet via the data lock.

At least one media change, in particular at least one physical media change, a protocol change and/or a transport media change, is preferably carried out in the input data path.

Sequences are preferably counted and/or signatures are transmitted in order to detect errors in the transmission of data.

The computing device preferably controls or at least concomitantly controls the data lock, preferably in such a manner that, if only outgoing data traffic is allowed or is intended to be allowed, the computing device is connected to the data lock and the connection between the data lock and the data transmitting device is prevented, and, if data are intended to be transmitted, the computing device initiates a switchover of the data lock.

The invention is explained in more detail below on the basis of exemplary embodiments; in the drawings, and by way of example.

DETAILED DESCRIPTION OF THE INVENTION

In the figures, the same reference signs are always used for identical or comparable components for the sake of clarity.

Figure 1:
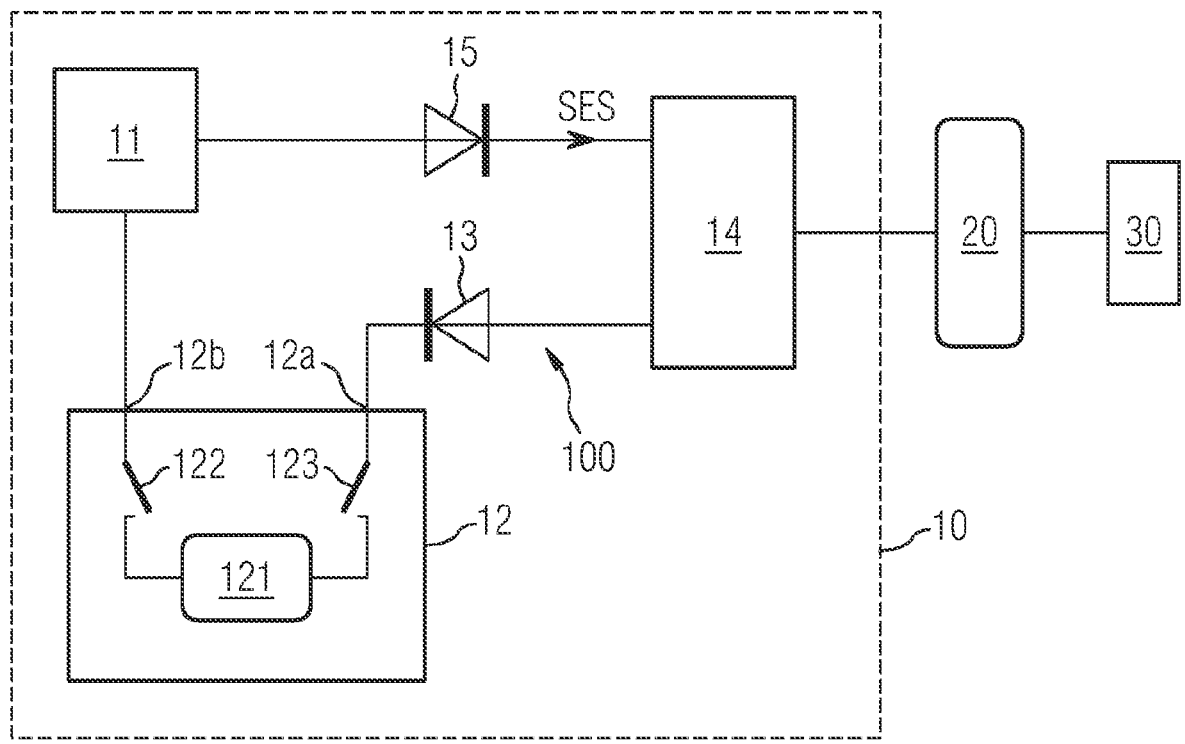
FIG. 1 shows an exemplary embodiment of an arrangement having a computing system according to the invention and an external data transmitting device.

FIG. 1 shows a computing system 10 having a computing device 11. The computing device 11 is connected to a communication network 20, which is only indicated, via a data lock 12, an input data diode 13 and an interface device 14. The computing system 10 can receive data and request messages Sa from an external data transmitting device 30 via the communication network 20. The communication network 20 may be an office network or the Internet, for example.

The data lock 12 has a first connection 12a which is connected to the input data diode 13. A second connection 12b of the data lock 12 is connected to the computing device 11. The data lock 12 comprises a buffer 121 which makes it possible to buffer data. The buffer 121 is connected to the second connection 12b via a first switch 122 and is connected to the first connection 12a via a second switch 123. The two switches 122 and 123 may be switched off at the same time, but are never switched on at the same time. The buffer 121 can therefore be either isolated or connected to a single one of the two connections 12a and 12b. The switches 122 and 123 can be controlled by an internal control unit of the data lock 12 or from the outside, for example by the computing device 11.

In the exemplary embodiment according to FIG. 1, the data lock 12, the input data diode 13 and the interface device 14 form an input data path 100 of the computing system 10, which input data path makes it possible to unidirectionally transmit data from the interface device 14 in the direction of the computing device 11 in a non-transparent manner. In order to achieve the non-transparency, the data lock 12 is provided, the first connection 12a of which can be connected to the input data diode 13 in order to receive data from the input data diode 13; at this time, the second connection 12b of the data lock 12 is disconnected from the computing device 11, with the result that no immediate or direct data flow from the input data diode 13 in the direction of the computing device 11 is possible. Data which are fed into the data lock 12 from the input data diode 13 via the first connection 12a are initially buffered in the buffer 121. After buffering, the data lock 12 can be switched over, wherein the first connection 12a is disconnected from the input data diode 13 and the second connection 12b of the data lock 12 is only then connected to the computing device 11. In other words, the data lock 12 is configured in such a manner that its two connections 12a and 12b are always exclusively connected either to the input data diode 13 or to the computing device 11, but never to both connections or both units at the same time.

On the output side, the computing device 11 can be connected, via a unidirectionally operating output data diode 15, to the communication network 20 and the external data transmitting device 30, whether directly or indirectly, for example via the interface device 14 (as shown in FIGS. 1 to 10) or another component of the computing system 10 which is not described any further.

The computing device 11 is configured in such a manner that it accepts data present in the interface device 14 from the interface device 14 only when said data are transmitted from the interface device 14 to the computing device 11 via the input data path 100 within a transmission session SES which is initiated by the computing device 11 itself with the inclusion of the output data diode 15 and is encrypted. Since the data lock 12 forms a component part of the input data path 100, the data lock 12 is automatically incorporated in the session handling.

A typical sequence would be, for example, the fact that the switch 122 is initially closed; the data lock 12 now waits for a trigger/control signal from the computing device 11, for example. This is generated by the computing device 11 as soon as the computing device 11 has transmitted a corresponding session context to the interface device 12 and thus starts the next transmission session SES. If the trigger/control signal is present, a control unit of the data lock 12, which is integrated in the buffer 121, for example, and is not shown any further, opens the switch 122 and closes the switch 123.

The buffer 121 now waits for incoming data via the input data path 100 containing the corresponding session information relating to the transmission session SES. If a corresponding message arrives, the switch 123 is opened. The buffer 121 is now completely "offline" and carries out a validation while taking into account the received context information relating to the transmission session SES. After the validation, the switch 122 is closed and the data lock 12 notifies the computing device 11 of the result (for example in the form of the data or the validation result). After that, the data lock 12 again waits for control by the computing device 11.

The data lock 12 can be controlled, as described, by means of the computing device 11, for example; alternatively, the data lock 12 itself can implement the control logic, for example using simple temporal control/polling or the like.

Data can be transmitted from the external data transmitting device 30 to the computing device 11, for example, after the computing device 11 has transmitted a corresponding request to the external data transmitting device 30, or alternatively as a response of the computing device 11 to a corresponding request from the external data transmitting device 30. The text below shall initially explain, for example, how data can be advantageously transmitted on the initiative of the external data transmitting device 30:

If the external data transmitting device 30 transmits a request message Sa to the interface device 14, which request message is used by the external data transmitting device 30 to indicate the desire to transmit data in the direction of the computing device 11, the interface device 14 will process the request message Sa. The interface device 14 can check, for example, whether the request message has been transmitted from a known source or in a sufficiently signed form and/or is free of control commands or control programs.

If the interface device 14 determines during its check that the request message Sa is not critical, it can transmit this message in unchanged form or in modified form as a modified request message Sal in the direction of the computing device 11 via the unidirectional input data path 100. Since the interface device 14 knows that the computing device 11 will accept data of any type, that is to say including the request message Sa or the modified request message Sal, only when said data are transmitted within a transmission session SES initiated by the computing device itself, it will possibly postpone the forwarding of the request message Sa or the modified request message Sal or will carry it out only when the computing device 11 has already previously started such a transmission session SES, as indicated in FIG. 1.

Figure 2:
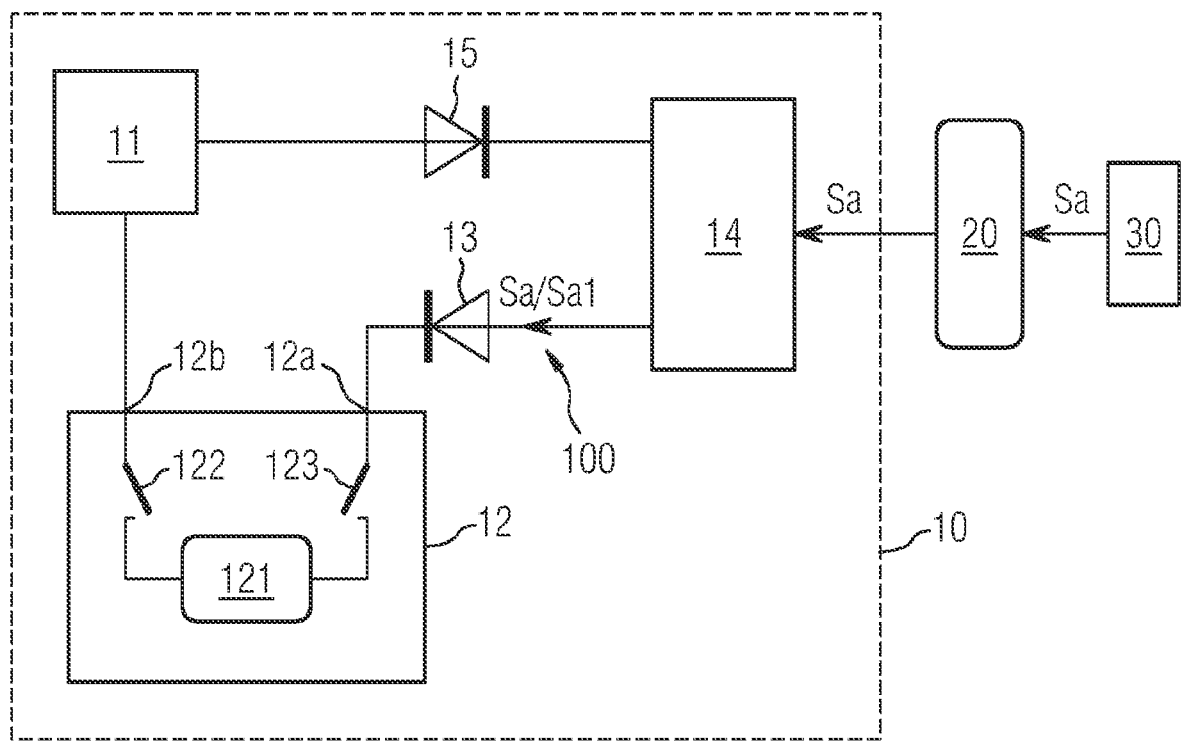
FIGS. 2-10 show further illustrations of the arrangement according to FIG. 1 during exemplary data transmission.

FIG. 2 shows the forwarding of the request message Sa or the modified request message Sal in the already existing transmission session SES.

Figure 3:
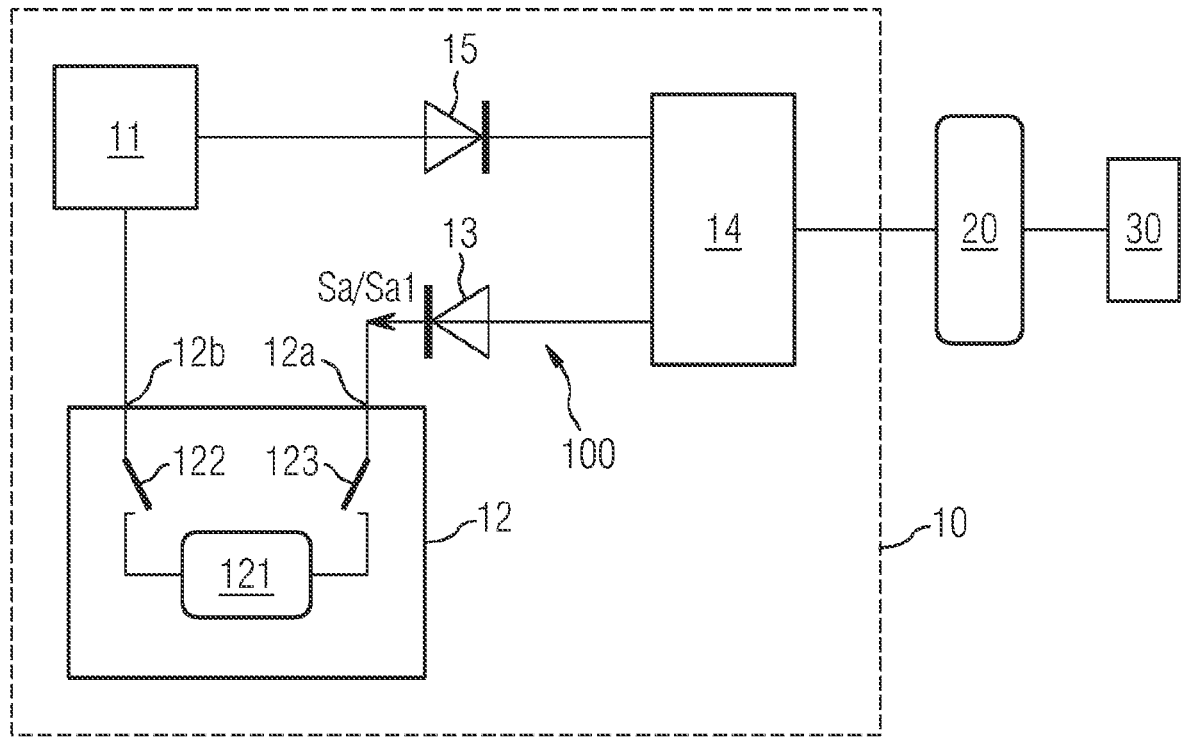

FIG. 3 shows how the request message Sa or the modified request message Sal passes, via the unidirectional input data path 100, to the input data diode 13 and, from the latter, to the first connection 12a of the data lock 12.

If the data lock 12 or its buffer 121 is connected to the input data diode 13 via the first connection 12a, the request message Sa or the modified request message Sal can be stored in the buffer 121.

Figure 4:
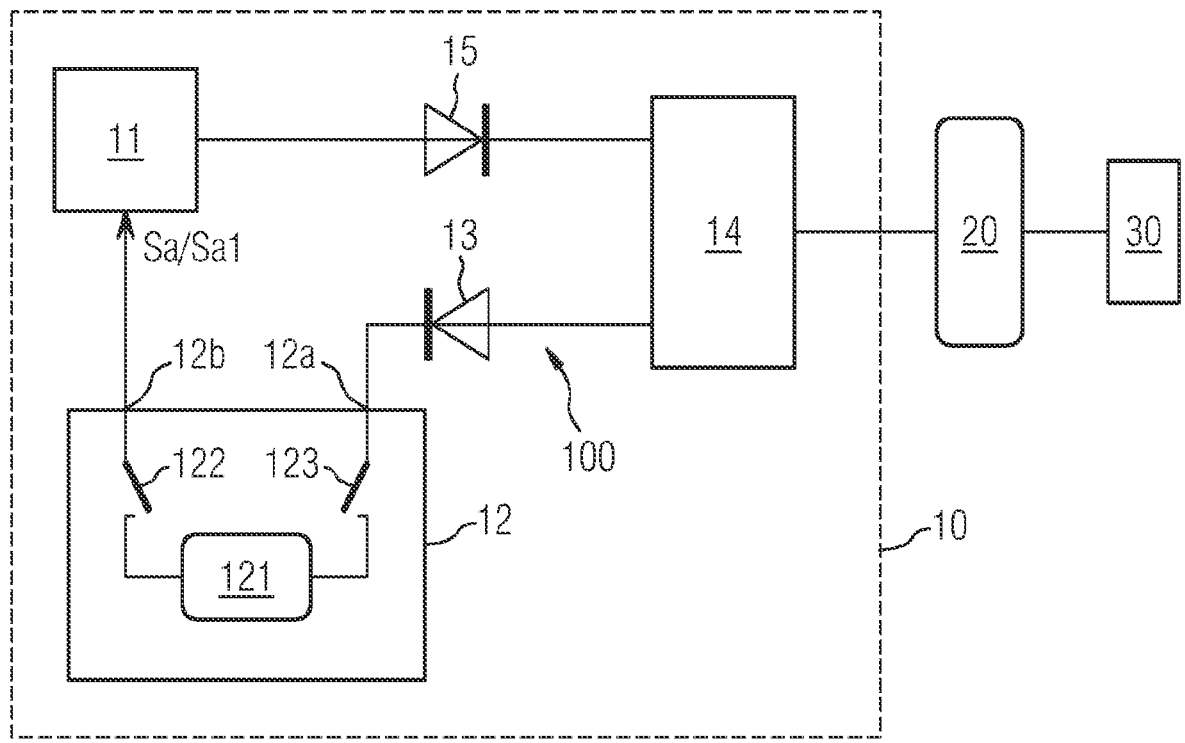

As soon as the first connection 12a of the data lock 12 has been disconnected from the input data diode 13, the second connection 12b of the data lock 12 can be connected to the computing device 11 and the request message Sa or the modified request message Sal stored in the buffer 121 can be transmitted to the computing device 11 (see FIG. 4).

As soon as the computing device 11 has received the request message Sa or the modified request message Sal, it can process said message and decide whether it wants to or can receive data from the external data transmitting device 30.

It is assumed by way of example below that the request message Sa or the modified request message Sal signals to the computing device 11 that update messages or update software is/are intended to be transmitted by the external data transmitting device and that such transmission is also permissible.

Figure 5:
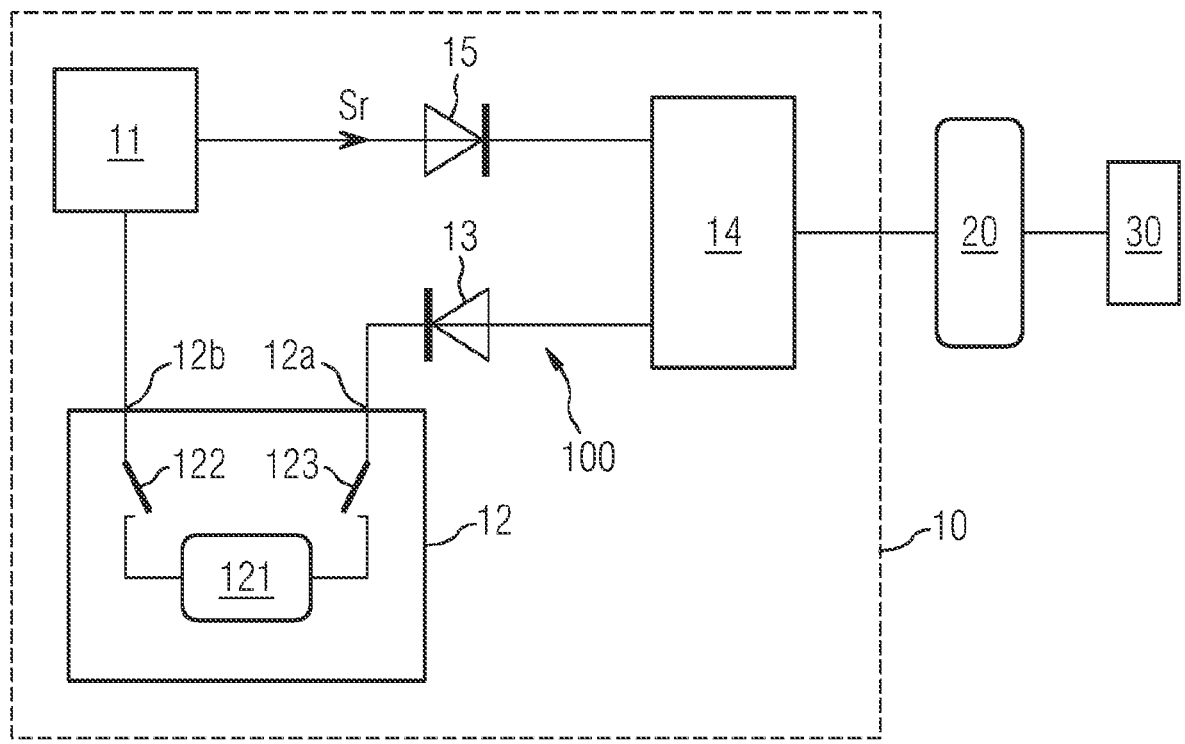
Figure 6:
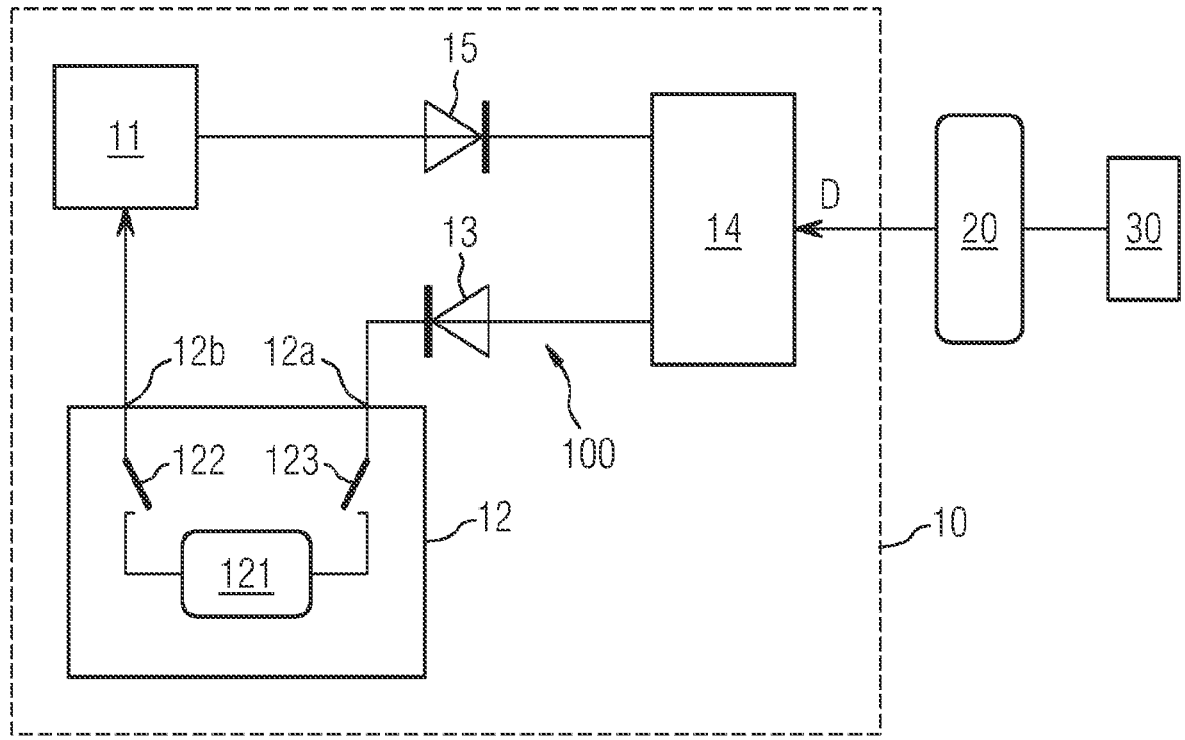

In the last-mentioned case, the computing device 11 will transmit a response message Sr to the communication network 20 and therefore to the external data transmitting device 30 via the output data diode 15, as shown by way of example in FIG. 5. The response message Sr can be transmitted directly from the output data diode 15 to the external data transmitting device 30 via the communication network 20 or instead indirectly via the interface device 14.

The response message Sr preferably contains details of a predefined time or time slot at which or in which the interface device 14 of the computing system 10 is available to receive further data from the external data transmitting device 30 and will make it possible to receive further data. The times or time slots preferably correspond to those times or time slots at which or in which the computing device 11 intends to hold a transmission session SES with the interface device 14 so that it is possible to promptly forward the data. As soon as the external data transmitting device 30 has received the response message Sr from the computing device 11, it can transmit its data D, for example update data, to the interface device 14 while complying with the predefined times or time slots which have been predefined by the computing device 11 (see FIG. 6).

Figure 7:
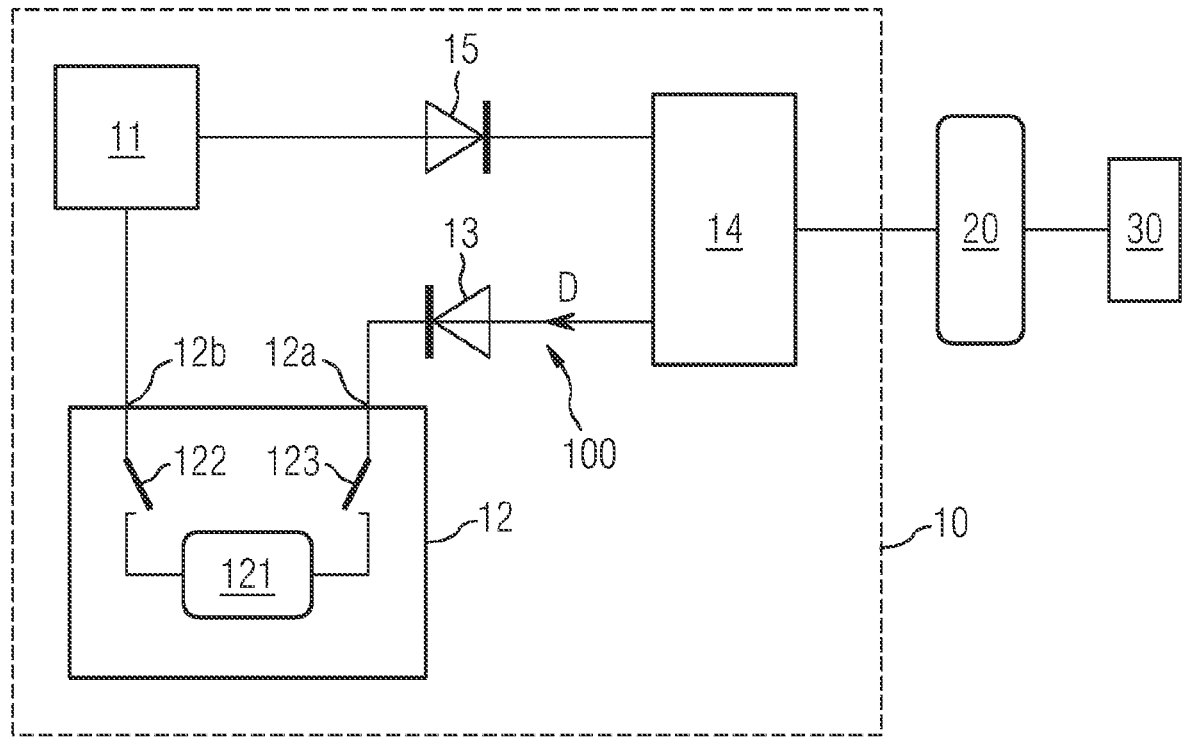
Figure 8:
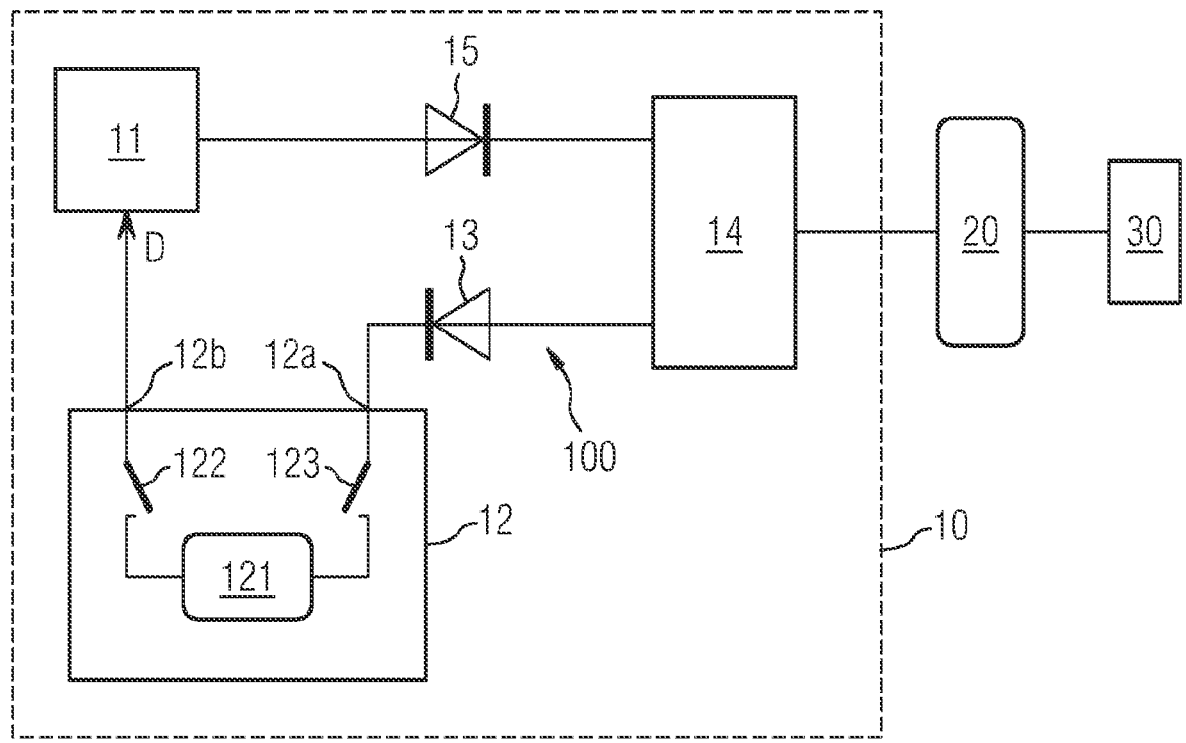
Figure 9:
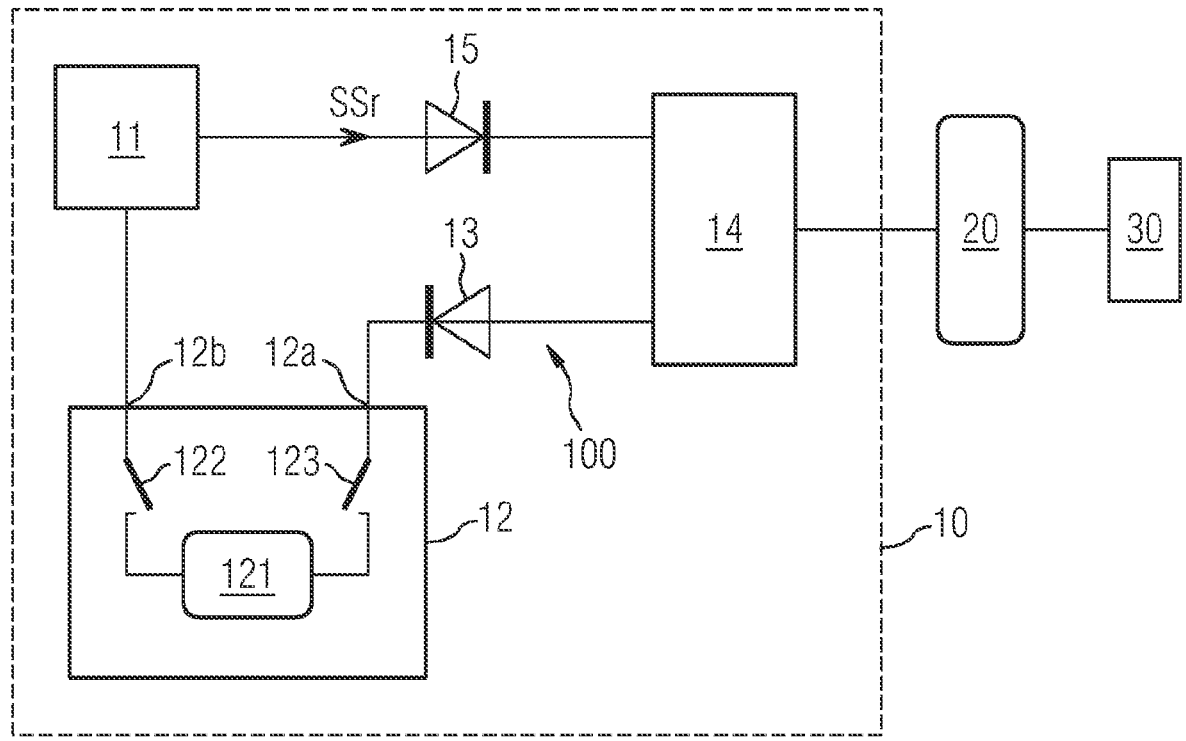
Figure 10:
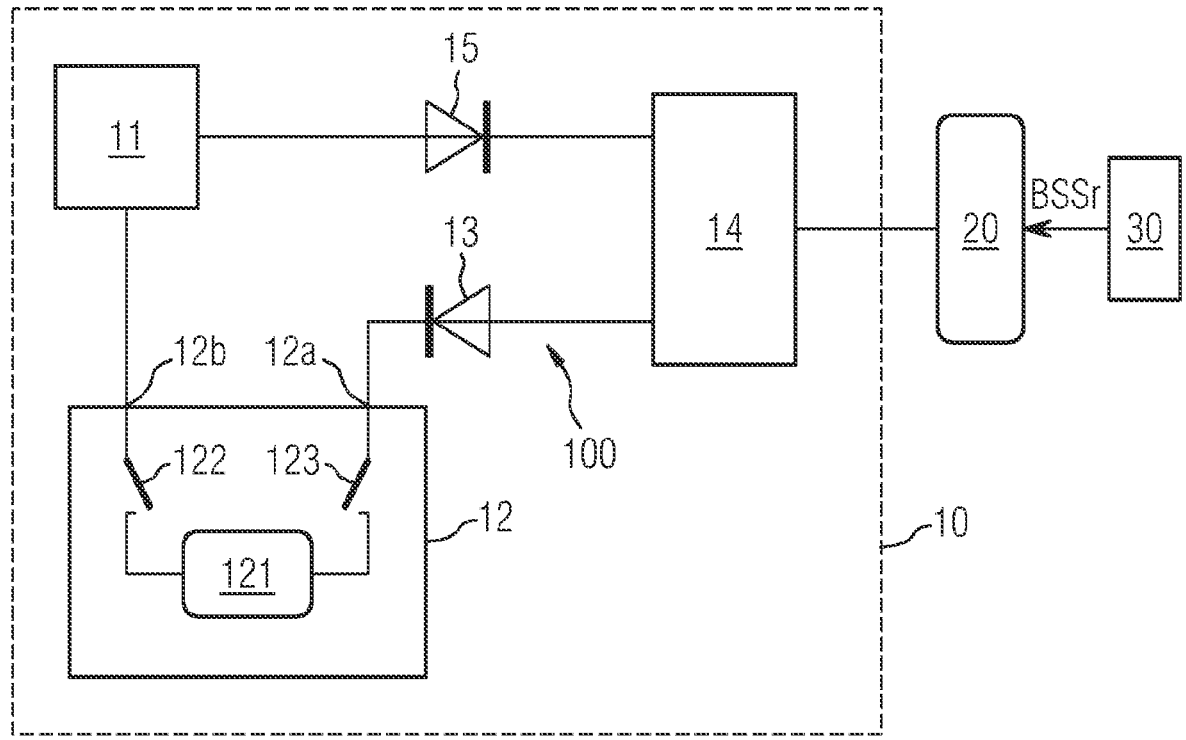

The interface device 14 will expect the data at the predefined times or in the predefined time slots and will transmit said data to the computing device 11 via the input data path 100, provided that there is a transmission session SES with the computing device 11 or possibly in the next transmission session SES in each case (see FIG. 7).

The interface device 14 receives the information relating to the predefined times or time slots at which or in which it is intended to make it possible to receive data, for example by means of the response message Sr, provided that the latter is fed into the communication network 20 via the interface device 14; otherwise, it is preferably informed separately by the computing device 11.

The data D transmitted from the external data transmitting device 30 via the interface device 14 at the predefined times or in the predefined time slots are transmitted via the input data path 100 and therefore via the data lock 12, with the result that direct access of the external data transmitting device 30 or of the interface device 14 to the computing device 11 is again not transparently possible at any time.

After the data D from the external data transmitting device 30 have been transmitted—preferably data packet by data packet—to the computing device 11 via the interface device 14 and the data lock 12 (see FIG. 8), the computing device 11 can check whether the received data packets or the received data D have been transmitted and received without damage or without change overall; such a check can be carried out, for example, on the basis of checksums, hash codes or the like.

If the computing device 11 comes to the conclusion that the received data from the external data transmitting device 30 have been correctly received, it can generate a signature data record SSr and can transmit it to the external data transmitting device 30 via the output data diode 15 and the communication network 20. The transmission may incorporate the interface device 14 or another component not shown in FIG. 1 (see FIG. 9).

The external data transmitting device 30 now has the opportunity to in turn check, on the basis of the received signature data record SSr, whether the data D received by the computing device 11 are correct or have been correctly received by the latter. If it determines, on the basis of the signature data record SSr, that data have been correctly received by the computing device 11 via the input data path 100, the external data transmitting device transmits, on the output side, a confirmation signal BSSr to the computing device 11 via the interface device 14 and the input data path 100, that is to say with the inclusion of the data lock 12 (see FIG. 10).

Only after the computing device 11 has received this confirmation signal BSSr from the external data transmitting device 30 does it assume that data have been correctly received via the input data path 100 and the data D can be used.

In connection with FIGS. 1 to 10, it was assumed, by way of example, that the data are transmitted on the initiative of the external data transmitting device 30; alternatively, the computing device 11 may itself actively request a transmission of data from the external data transmitting device 30; the statements made above apply accordingly in this case.

Although the invention has been described and illustrated more specifically in detail by means of preferred exemplary embodiments, the invention is not restricted by the disclosed examples and other variations can be derived therefrom by a person skilled in the art without departing from the scope of protection of the invention.

The invention claimed is:

1. A computing system, comprising:
a computing device;
an interface;
an input data path unidirectionally connecting said interface to said computing device, said input data path having a data lock with a first connection and a second connection, said data lock is connected, by way of said first connection, to said interface device and, by way of said second connection, to said computing device;
an output data diode unidirectionally connecting said computing device to said interface;
said data lock having a buffer for buffering data and configured such that said buffer can either be exclusively connected to said first connection or said second connection, but not to both said first and second connections at a same time; and
said computing device configured in such a manner that said computing device accepts the data present in said interface from said interface only when the data are transmitted from said interface to said computing device via said input data path within a transmission session initiated by said computing device itself with an inclusion of said output data diode.

2. The computing system according to claim 1, wherein said interface is suitable for receiving an external request message which comes from an external data transmitting device and indicates a desire of the external data transmitting device to transmit data to said computing device.

3. The computing system according to claim 2, wherein said interface is configured in such a manner that, after receiving the external request message from the external data transmitting device, said interface creates a modified request message containing a request and forwards the modified request message to said data lock, wherein the modified request message contains identification data relating to said interface.

4. The computing system according to claim 2, wherein said interface is configured in such a manner that:
after receiving the external request message, said interface carries out a check in order to determine whether the external request message comes from the external data transmitting device which is authorized to transmit data; and
in an event of the external request message coming from an authorized data transmitting device, said interface transmits the external request message or the modified request message to said data lock and otherwise does not do so.

5. The computing system according to claim 2, wherein said interface is configured in such a manner that after receiving the external request message, said interface carries out a check in order to determine whether the external request message contains control commands or executable software modules, and if this is true, said interface does not forward the external request message to said data lock.

6. The computing system according to claim 2, wherein: said interface buffers external data which have been transmitted by the external data transmitting device at a request of said computing device or without the request; and
said computing device is configured in such a manner that said computing device accepts the data buffered in said interface, in unprocessed form or in a form processed by said interface, from said interface only when the data are transmitted from said interface to said computing device via said input data path within the transmission session which is initiated by said computing device itself with an inclusion of said output data diode.

7. The computing system according to claim 6, wherein the data is encrypted.

8. The computing system according to claim 1, wherein said input data path has an input data diode which is disposed between said interface and said data lock and allows the data to be transmitted in a direction of said data lock disposed downstream and prevents this in the opposite direction.

9. A railway system, comprising:
the computing system according to claim 1.

10. The railway system according to claim 9, wherein the rail system is a signal tower.

11. A method for operating a computing system, which comprises the steps of:
accepting data, via a computing device of the computing system, from an external data transmitting device, which arrive via an interface, only when the data are transmitted from the interface via an input data path, which contains a data lock disposed downstream of the interface, within a transmission session which is initiated by the computing device itself with an inclusion of an output data diode, wherein the data lock is either exclusively connected to the interface or to the computing device in terms of a data stream, but is not connected to both the computing device and the interface at a same time.

12. The method according to claim 11, wherein:
after receiving the data from the external data transmitting device, the computing device creates a signature data record using the data and transmits the data to the external data transmitting device via the output data diode; and
the computing device only uses or considers the data received if the external data transmitting device, after receiving the signature data record, reports back that the signature data record confirms correct data reception.

13. The method according to claim 11, wherein:
creating, after receiving an external request message from the external data transmitting device, a modified request message containing a request using the interface and forwarding the modified request message to the data lock, wherein the modified request message contains identification data relating to the interface; and/or
carrying out, after receiving the external request message, a check in order to determine whether the external request message comes from the external data transmitting device which is authorized to transmit the data, the external request message or the modified request message is transmitted to an input data diode in an event of the external request message being from an authorized data transmitting device and this is otherwise not carried out; and/or
carrying out, after receiving the external request message, a check in order to determine whether the external request message contains control commands or executable software modules, and, if this is the case, the external request message is not forwarded to the input data diode; and/or
creating, after receiving the data from the external data transmitting device, via the computing device a signature data record using the data and transmitting the signature data record to the external data transmitting device via the output data diode; and/or
buffering the external request message or the modified request message and/or the data from the external data transmitting device in a buffer in the input data diode or using a buffer between the input data diode and the data lock and are only then transmitted, in a manner divided into data packets, to the computing device data packet by data packet via the data lock; and/or
carrying out at least one media change, at least one physical media change, a protocol change, and/or a transport media change, in the input data path; and/or
counting sequences and/or transmitting signatures in order to detect errors in a transmission of data; and/or
controlling, via the computing device at least concomitantly the data lock, in such a manner that, if only outgoing data traffic is intended to be allowed, the computing device is connected to the data lock and a connection between the data lock and the external data transmitting device is prevented, and, if the data are intended to be transmitted, the computing device initiates a switchover of the data lock.

14. The method according to claim 11, wherein the data is encrypted.

* * * * *